Aug. 14, 1945.　　　　D. CREW　　　　2,382,135
AIR-DRIVEN GYROSCOPIC INSTRUMENT
Filed Feb. 25, 1943

Inventor
David Crew
by Stevens and Davis
his attorneys

Patented Aug. 14, 1945

2,382,135

UNITED STATES PATENT OFFICE 2,382,135

AIR-DRIVEN GYROSCOPIC INSTRUMENT

David Crew, Kingston By-Pass, New Malden, England, assignor to Reid & Sigrist Limited, New Malden, Surrey, England Application February 25, 1943, Serial No. 477,154
In Great Britain March 2, 1942

2 Claims. (Cl. 287—97.3)

This invention relates to air driven gyroscopic instruments, such as direction indicators, rate of turn indicators, artificial horizons and the like.

It is the primary object of the invention to provide improvements in such instruments, more especially with a view to increasing the power which is derived from a given current of air. This is of particular importance for the gyroscopic instruments of aircraft, for the available air pressure drops seriously as the altitude increases. It is a further object of the invention to provide an improved fluid packing for use between a pair of relatively rotatable parts of an air driven gyroscopic instrument, the seal having very little working friction.

In a gyroscopic instrument having a rotational bearing arranged to conduct working fluid which drives the gyro rotor, the present invention is characterised by the fact that a hollow stem through which the working fluid passes, and which is carried by one of the relatively rotatable parts, is surrounded by and rotatable within a washer-like member adapted to bear slidably against the other of said relatively rotatable parts.

According to a further aspect of the invention, there is provided a gyroscopic instrument having a rotational bearing including a hollow stem which conducts working fluid used for driving the gyro rotor, said stem being arranged co-axially with respect to the rotational movement and being secured to one of the relatively rotatable members so as to extend through a passage formed in the other of said members, characterised by the fact that the stem is surrounded by a washer-like member which fits snugly but revolvably upon the stem, and which bears against the said other member with freedom to adjust itself radially relative to said other member.

Preferably, the washer-like member is disposed within an annular housing formed in the said other member, the washer-like member conveniently bearing against a shoulder formed in the said other member and being held in position by a bearing race fitted to said other member. The bearing race may be larger in diameter than the housing so that it bears against a second shoulder in said other member, the axial separation of the two shoulders being only slightly greater than the axial thickness of the washer-like member so that when the race is in position the washer-like member has freedom to move radially.

According to another aspect of the invention there is provided in a gyroscopic instrument a bearing comprising in combination a pair of bearing races, balls between said races, a tubular stem attached to one race and extending through the other race, an annular washer freely rotatable upon the stem but without substantial freedom, and means for maintaining the washer against the other bearing race, at the same time permitting it to move radially in any direction so as to compensate for wobbling of the stem relative to said other bearing race, and at the same time maintain a substantially fluid-tight joint between the stem and said other race.

The invention is of particular utility in connection with a gyroscopic direction indicator and the improved bearing may advantageously serve for the pivotal mounting of a drum within a casing in such an instrument. The stem can conveniently be secured to the casing so as to extend into the drum, the washer-like member being disposed within a housing formed in the upper wall of said drum.

The invention is illustrated by way of example in the accompanying diagrammatic drawing, in which.

Figure 1:
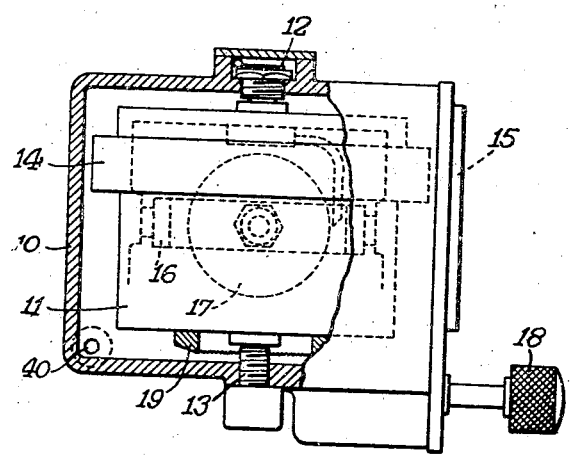
Figure 1 is a side elevation of a gyroscopic direction indicator shown partly in section.
Figure 2:
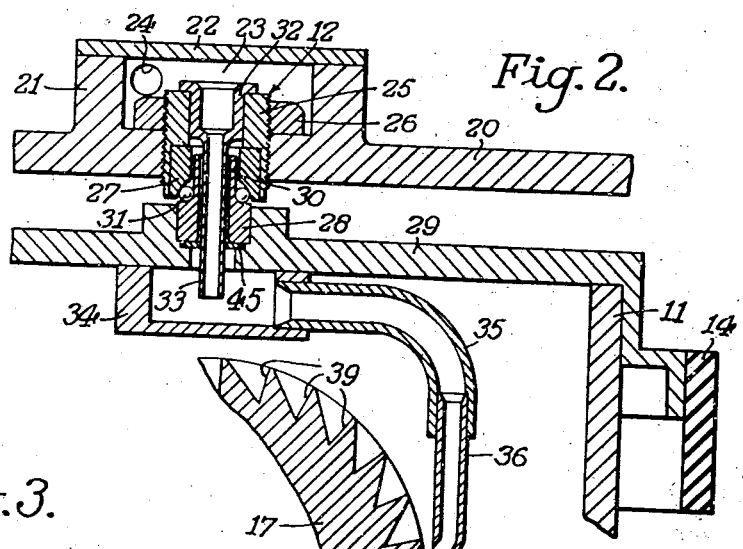
Figure 2 is a fragmentary sectional elevation of the upper part of the drum and the corresponding bearing drawn to an enlarged scale.

The instrument shown in Figure 1 comprises an outer casing 10 containing a cylindrical closed drum 11, which is mounted pivotally within the casing about its vertical axis by means of an upper bearing indicated generally at 12 and a lower bearing 13. The drum 11 is provided with a circumferential scale ring 14 which is arranged to be visible through a front glass, indicated at 15, so as to show the bearing in azimuth of the aircraft or the like to which the casing 10 is secured. The drum 11 itself serves as an outer gimbal and carries pivotally about a horizontal axis an inner gimbal frame 16 serving as the mounting for a gyro rotor 17 in the well-known manner. Setting means, such as a knob 18 and bevel gear ring 19, are usually provided to enable the angular position of the drum 11 to be adjusted as desired, a mechanical caging device (not shown) usually being provided to restore the gimbal frame 16 to a truly horizontal position and hold it so during the rotational adjustment of the drum 11. The details of construction of the upper bearing 12 are shown more clearly in Figure 2. The upper wall 20 of the casing 10 is formed with an upstanding continuous flange 21 which, together with a cover plate 22, produces a compartment 23; this is connected with the external atmosphere, say by way of a passage 24, a filter (not shown) being provided if desired.

A plug member 25, which is screw-threaded through the upper wall 20, is provided with a locking nut 26 and at its lower part it is bored to receive tightly an upper ball race member 27. A lower ball race member 28 is fitted tightly into a cylindrical recess formed in the central thickened portion of the upper wall 29 of the drum 11 and has a tubular portion 30 which fits with clearance within the upper ball race 27. A set of balls, indicated at 31, are introduced between the two race members 27 and 28 and act to take thrust as well as radial loads.

Fitted into the upper part of the plug member 25 is a stem member having an enlarged upper part 32 and a lower tubular portion 33. The tubular portion 33 extends within a box 34 which is secured to the underside of the wall 29 and which carries a bent tube 35 having a nozzle tube 36 secured to its lower end. The nozzle tube 36 is shaped with a nozzle 37 directed towards the periphery 38 of the gyro rotor 17, the latter being formed with steps or buckets 39 so that air issuing from the nozzle 39 maintains the gyro rotor 17 in continuous fast rotation.

Figure 3:
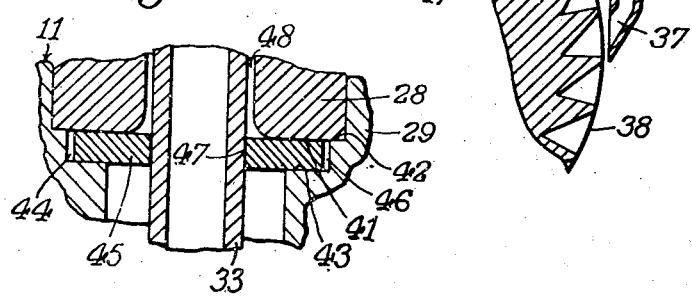
Figure 3 is a fragmentary sectional elevation of a detail in Figure 2 drawn to a still further enlarged scale.

To create such a stream of air through the nozzle 37 air is evacuated from the casing 10 through a passageway 40 (see Figure 1), which is conveniently connected with a venturi tube, vacuum pump or other suitable device. One or more holes (not shown) are formed in the lower wall of the drum 11. Therefore as the casing 10 is evacuated air from the atmosphere is drawn in through the passage 24, along the centre of the stem member 32, 33, thence through the tube 35 and nozzle 37 to the interior of the drum 11; from thence it flows through the holes in the bottom and reaches the passage 40. It will be seen that the creation of a partial vacuum within the casing 10 will also tend to draw air through the stem member 33 and up out of the annular space between the stem member 33 and the lower bearing member 28, said air then passing between the balls 31 into the outer casing 10. This, however, is undesirable partly because it represents a waste of driving energy but more especially because the air always carries minute particles of grit and these become lodged in the lubricant surrounding the balls 31 so that in course of time the bearing becomes jammed, or at least works stiffly and inefficiently. In the design of the parts sufficient clearance must be left between the bearing member 28 and the tubular stem 33 to ensure that there is no danger of these parts rubbing against one another when the instrument is in operation as this would cause unnecessary friction and would probably spoil the accuracy of the instrument. Further, the improved means according to the invention are incorporated, as will be seen more clearly in Figure 3.

When the lower bearing member 28 is forced into position within the upper wall 29 of the drum 11 it is arranged so that the marginal part of its lower plane surface 41 butts against a shoulder 42, thus definitely positioning the bearing member 28. Inwardly of the shoulder 42 the wall 29 is formed with a shallow circular recess, the bottom of which is constituted by a shoulder 43, said recess serving as an annular housing 44 for a flat washer-like member 45, conveniently composed of brass or other metal. The thickness of the member 45 is arranged to be very slightly less than the axial separation of the shoulders 42 and 43 and its outside diameter is appreciably less than the outside diameter of the shoulder 43 so that said member 45 normally has a clearance all round its periphery, as indicated at 46. Its bore 47, however, is a snug but freely rotatable fit upon the stem member 33, the actual clearance, of course, being considerably less than the clearance 48 between the stem member 33 and the lower bearing bush 28.

It will thus be seen that as the outer casing 10 with the stem member 33 rotates relative to the drum 11 any eccentricity of the stem member 33 relative to the axis of movement will cause the washer 45 to slide radially within the housing 44, this movement being freely permitted by the clearance between the parts. Nevertheless the washer 45 can rotate freely upon the stem member 33 and yet at all times maintains a substantially air-tight seal between said stem member 33 and the lower bearing race 28. A very slight film of lubricating medium, such as thin oil, on the parts improves the air sealing properties of the device and at the same time reduces the slight friction still further.

It will be understood that the construction which has been described is given only by way of example and that various modifications may be made to suit requirements. Thus more than one laterally slidable washer may be used, these conveniently being spaced axially so as to produce the effect of a labyrinth seal. Moreover the improved bearing may be used in various gyroscopic instruments, such as artificial horizons, and rate of turn indicators, as well as the component parts of automatic pilots and like apparatus for aircraft.

What I claim is:

1. In mechanism of the character described, two relatively rotatable members and bearing means for mounting said members for relative rotation comprising complementary ball races fixed to said members, balls disposed between the races in bearing engagement therewith, a hollow stem fixed to one of said members and extending into the other through the ball races to define a gas conduit coaxial with the axis of relative rotation of said members, said stem being wholly out of physical contact with said ball races and defining therewith an annular space, said other member having an internal annular groove defined in part by the respective ball race, and an annular washer in said groove mounted for free rotation about but in substantially fluid-tight engagement with said stem, said washer also being axially slidable on said stem and being mounted for free radial movement but restrained against axial movement in said annular groove by the respective ball race, the external diameter of said washer being less than the diameter of said groove, whereby the washer may be displaced radially of the axis of relative rotation of said members while maintaining substantially fluid-tight contact with the stem at all times.

2. The mechanism as claimed in claim 1 further comprising, a shoulder on said other member for maintaining the respective ball race against axial displacement, whereby the load on said bearing means is not transmitted to said washer and the latter is free to move in said groove.

DAVID CREW.